United States Patent
Tseng

(10) Patent No.: US 8,366,280 B2
(45) Date of Patent: Feb. 5, 2013

(54) LENS ADJUSTING DEVICE OF PROJECTOR

(75) Inventor: Yung-Chuan Tseng, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 497 days.

(21) Appl. No.: 12/453,752

(22) Filed: May 21, 2009

(65) Prior Publication Data

US 2009/0316117 A1     Dec. 24, 2009

(30) Foreign Application Priority Data

Jun. 18, 2008 (TW) ............................. 97210787 U

(51) Int. Cl.
  *G03B 21/14* (2006.01)

(52) U.S. Cl. ........ 353/100; 353/101; 353/119; 353/122; 349/5; 359/694

(58) Field of Classification Search .................. 353/100, 353/101, 119, 122; 359/694, 699, 813, 819, 359/822, 823, 804; 349/5, 7, 8, 9; 606/78, 606/60, 66, 67, 68
See application file for complete search history.

(56) References Cited

U.S. PATENT DOCUMENTS

| | | | | |
|---|---|---|---|---|
| 4,443,076 A | * | 4/1984 | Itabashi ........................ | 353/101 |
| 4,896,132 A | * | 1/1990 | Land .............................. | 353/94 |
| 5,269,784 A | * | 12/1993 | Mast .............................. | 606/288 |
| 5,283,599 A | * | 2/1994 | Tejima et al. .................. | 353/30 |
| 5,307,104 A | * | 4/1994 | Hamasaki ..................... | 396/531 |
| 5,865,521 A | * | 2/1999 | Hashizume et al. ............. | 353/38 |
| 6,364,491 B1 | | 4/2002 | Okada et al. | |
| 6,416,184 B1 | | 7/2002 | Arai et al. | |
| 6,671,108 B2 | * | 12/2003 | Koiwai et al. ................. | 359/819 |
| 6,909,558 B2 | * | 6/2005 | Orimo et al. ................... | 359/694 |
| 7,055,971 B2 | | 6/2006 | Gishi | |
| 7,090,360 B2 | * | 8/2006 | Kuroda et al. ................ | 353/119 |
| 7,187,508 B2 | * | 3/2007 | Chiang ......................... | 359/822 |
| 2001/0019398 A1 | * | 9/2001 | Agata ........................... | 353/100 |
| 2002/0044264 A1 | * | 4/2002 | Lu ................................. | 353/101 |
| 2005/0024603 A1 | * | 2/2005 | Yang et al. .................... | 353/100 |
| 2005/0057822 A1 | * | 3/2005 | Hayashi ....................... | 359/694 |

FOREIGN PATENT DOCUMENTS

| | | |
|---|---|---|
| TW | M245456 | 10/2004 |
| TW | M246632 | 10/2004 |

* cited by examiner

*Primary Examiner* — Georgia Y Epps
*Assistant Examiner* — Sultan Chowdhury
(74) *Attorney, Agent, or Firm* — Bacon & Thomas, PLLC

(57) ABSTRACT

A lens adjusting device including a frame, a lens, a base, at least a positioning structure, and a locking device is provided. The lens is fixed on the frame. The base has a through hole with a predetermined shape formed thereon. The positioning structure is disposed on the base for movably positioning the frame on a plane above the base. The locking device including a screw, a nut, and a fixer is capable of fixing the frame to the base. The screw penetrates the frame and extends to below the base through the through hole of the base. The size of the through hole is greater than the size of a corresponding cross-section of the screw. The nut is disposed below the base and assembled to the screw to position the screw on the base. The fixer is disposed on the frame to constrain the rotation of the nut.

12 Claims, 8 Drawing Sheets

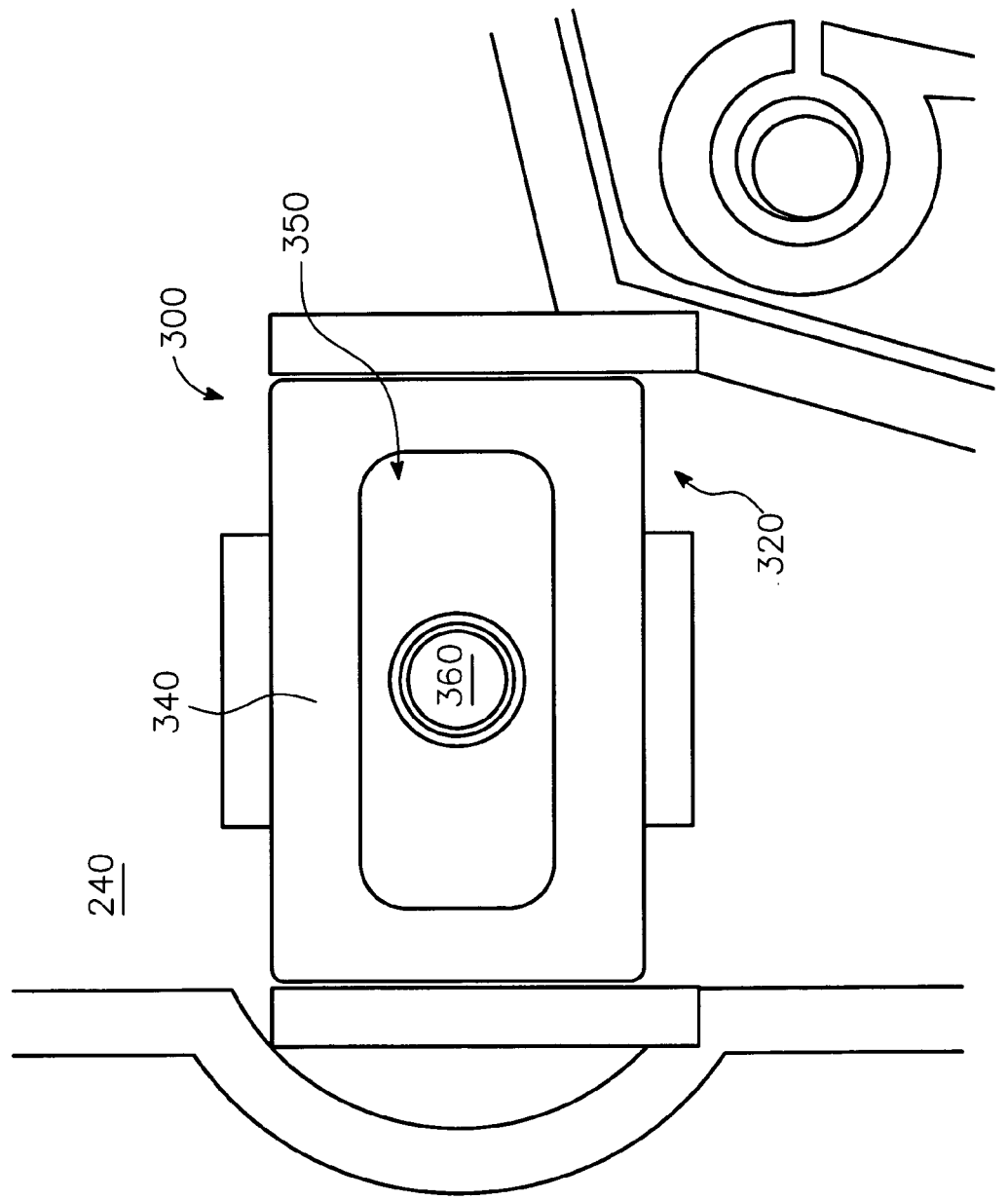

LENS ADJUSTING DEVICE OF PROJECTOR

BACKGROUND OF THE INVENTION (1) Field of the Invention

This invention relates to a lens adjusting device, and more particularly relates to a lens adjusting device of a projector.

(2) Description of the Prior Art

FIG. 1 is a block diagram showing a conventional projector 10. As shown in FIG. 1, the projector 10 has a light source module 12, an image module 14, and a projection module 16. The light source module 12 provides light beams for projection. The image module 14 adopts the light beams from the lamp source module 12 to transfer an input image signal into an imaging light beam. The imaging light beam is projected to a screen through the lens of the projection module 16.

The position of images on the screen is adjusted to satisfy the need of observers. For this purpose, a conventional method is to dispose a lens adjusting device in the projector to adjust the location of lens. FIG. 2 is a schematic view of a conventional lens adjusting device 100 in a projector. As shown, the lens adjusting device 100 includes a base 120, a vertical adjusting frame 140, and a horizontal adjusting frame 160. Two guiding rods 130 are disposed by the left and the right sides of the base 120 respectively. The vertical adjusting frame 140 is assembled on the two guiding rods 130. In addition, two guiding rods 150 are disposed by the up and the down sides of the vertical adjusting frame 140 respectively. The horizontal adjusting frame 160 is assembled on the two guiding rods 150. The lens 180 is fixed on the horizontal frame 160. In the lens adjusting device 100, the vertical adjusting frame 140 may be regarded as a vertical movable platform and the horizontal adjusting frame 160 as a horizontal movable platform, so as to achieve the object of adjusting the position of the lens 180.

Noticeably, the lens adjusting device 100 needs two separated frames 140,160 and four guiding rods 130,150 to adjust the position of the lens 180. The whole structure is rather complicated. Excessive components raise not only cost but also weight of the entire device. In addition, a greater room is also needed for holding this lens adjusting device 100.

Furthermore, the lens adjusting device should be able to fix the lens 180 at the adjusted position. The vertical adjusting frame 140 and the horizontal adjusting frame 160 as shown in FIG. 1 lack the ability of fixing the lens. Since a motor (not shown) is usually capable of driving a gear group to adjust the vertical adjusting frame 140 and the horizontal adjusting frame 160, the lens 180 may be fixed by restricting the rotation of the motor. Thus, it creates extra burden for the motor in this way. Besides, if the position of the lens is adjusted manually, it is unable to use the motor to fix the position of the lens 180.

SUMMARY OF THE INVENTION

The invention is to provide a lens adjusting device capable of fixing the lens at the adjusted position without the help of a motor.

A lens adjusting device in accordance with an embodiment of the invention including a frame, a lens, a base, at least a positioning structure, and a locking device is provided. The lens is fixed on the frame. The base has a through hole with a predetermined shape. The positioning structure is disposed on the base for movably positioning the frame on a plane above the base. The locking device is capable of fixing the frame to the base. The locking device includes a screw, a nut, and a fixer. The screw penetrates the frame and extends to below the base through the through hole of the base, and the size of the through hole is greater than the size of a cross-section of the screw corresponding to the through hole. The nut is disposed below the base and is assembled to the screw to position the screw on the base. The fixer is disposed on the frame to constrain the rotation of the nut.

The conventional lens adjusting device needs motors for fixing the lens at the adjusted position. In case the horizontal adjusting frame and the vertical adjusting frame are used to adjust the position of the lens, two motors are needed to fix the lens in the horizontal direction and the vertical direction respectively. In comparison, the embodiments of the invention only needs one locking device to fix the lens at the certain position and may reduce the burden of the motors. Moreover, as the position of the lens is adjusted manually, the lens adjusting device in the embodiments of the invention may be used to fix the lens at the certain position without the need of the motor.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The invention will now be specified with reference to its embodiment illustrated in the drawings, in which

FIG. 6A is a schematic view of an embodiment of the positioning structure in FIG. 3;

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 3:
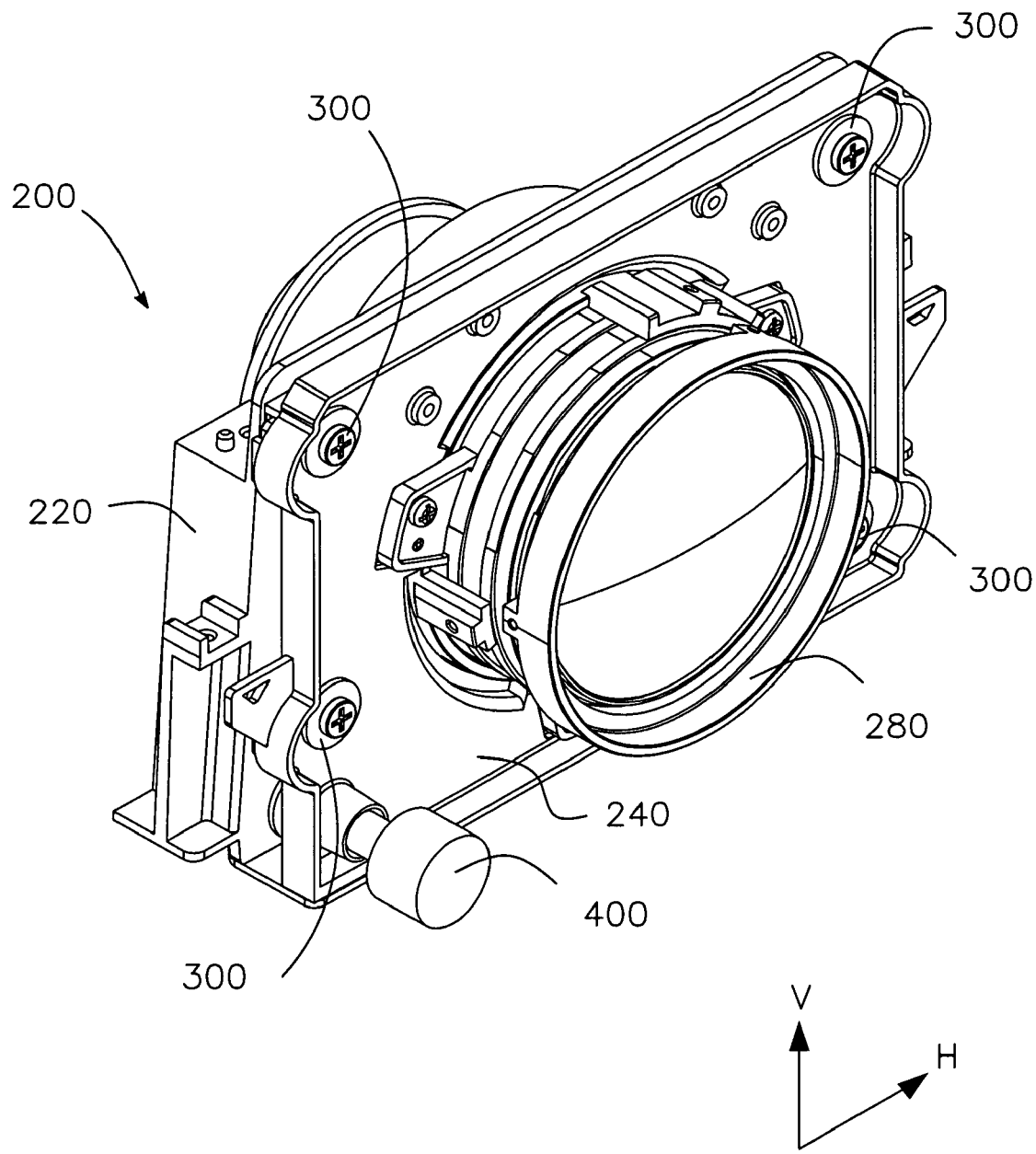
FIG. 3 is a schematic view of an embodiment of the lens adjusting device according to the invention.

FIG. 3 is a schematic view of an embodiment of the lens adjusting device 200 according to the invention. As shown in FIG. 3, the lens adjusting device 200 has a frame 240, a lens 280, a base 220, at least one positioning structure 300 (four positioning structures 300 are shown for example) and a locking device 400. The lens 280 is fixed on the frame 240. Four positioning structures 300 are disposed on the frame 240 and the base 220 and evenly distributed around the lens 280 for movably positioning the frame 240 together with the lens 280 on a plane above the base 220. For an embodiment, the plane is parallel to the upper surface of the base 220 and is vertical to an optical axis of the lens 280 to avoid definition of images on the screen from being effected when the position of the lens 280 is adjusted. The locking device 400 is capable of fixing the frame 240 to the base 220.

Figures 4A, 4B:
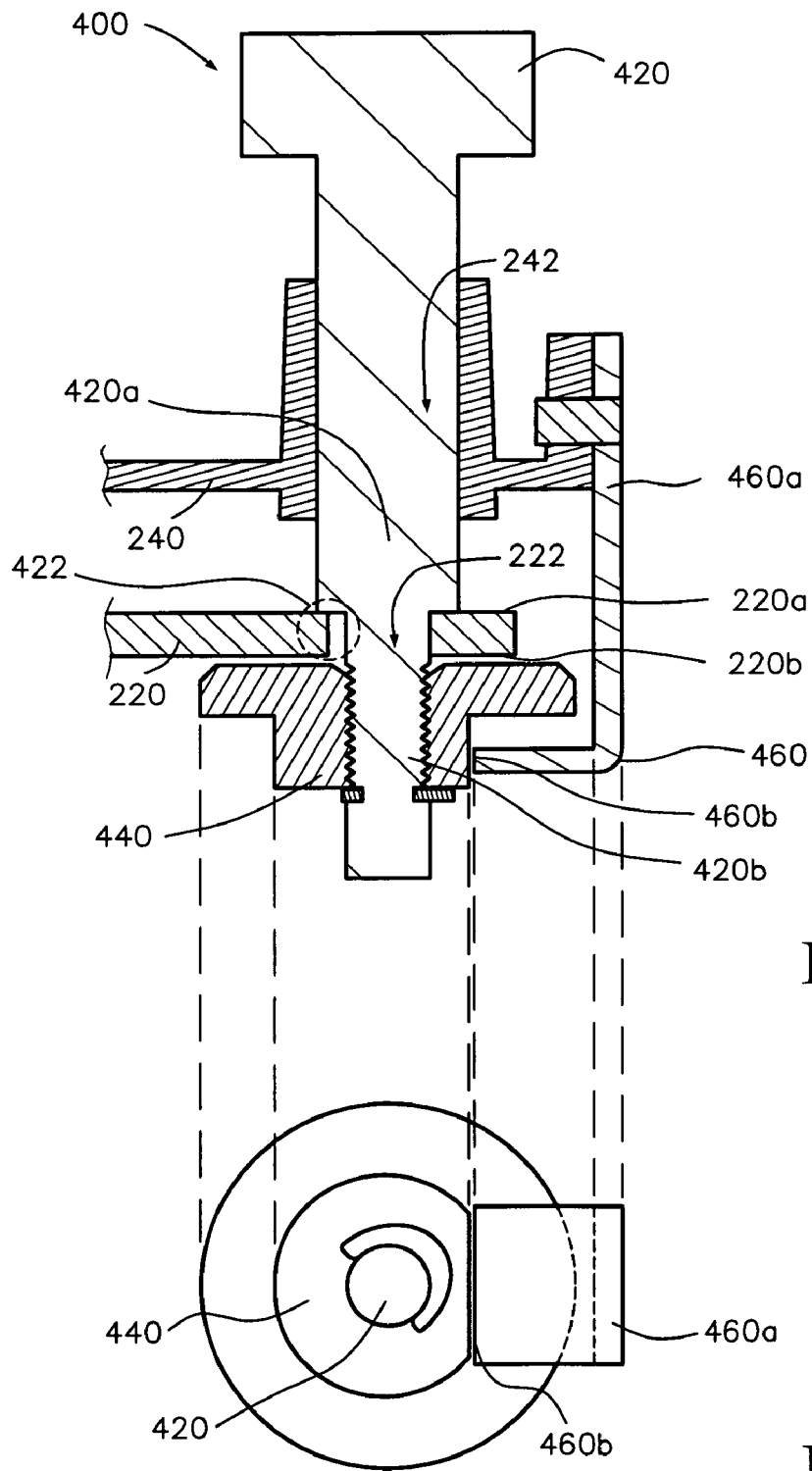
FIGS. 4A and 4B are cross-section views of an embodiment of the locking device in FIG. 3.

FIG. 4A is a cross-section view of the locking device 400 in FIG. 3. As shown in FIG. 4A, a guiding hole 242 is formed in the frame 240 and a through hole 222 is formed in the base 220. The through hole 222 of the base 220 aligns to the guiding hole 242 of the frame 240. The locking device 400 includes a screw 420, a nut 440, and a fixer 460. The screw 420 penetrates the frame 240 through the guiding hole 242 of the frame 240 and extends to below the base 220 through the through hole 222 of the base 220. The nut 440 is disposed below the base 220 and is assembled to the thread portion of the screw 420 to fix the screw 420 on the base 220. The fixer 46 is disposed on the frame 240 to constrain the rotation of the nut 440.

Noticeably, the size of the guiding hole 242 of the frame 240 is substantially the same as the size of a cross-section of the screw 420 corresponding to the guiding hole 242. Thus, the screw 420 may be moved only along the guiding hole 242 and the traverse movement of the frame 240 with respect to the screw 420 is prohibited. However, the size of the through hole 222 of the base 220 is greater than the size of the cross-section of the screw 420 corresponding to the through hole 222. Thus, the traverse movement of the screw 420 with respect to the base 220 is not totally prohibited and is only restricted in a predetermined range. The size of the predetermined range depends on the size and shape of the through hole 222 of the base 220.

In the embodiment of FIG. 4A, the main body of the screw 420 has a ladder structure 422 corresponding to the upper surface 220a of the base 220 and separates the screw 420 into an upper part 420a and a lower part 420b. When the nut 440 is locked to the screw 420, the ladder structure 422 and the nut 440 closely lean on the upper surface 220a and the lower surface 220b of the base 220 respectively so as to fix the screw 420 on the base 220. Noticeably, the size of the cross-section of the upper part 420a is greater than the size of the through hole 222 of the base 220 to ensure that the upper part 420a of the screw 420 is above the base 220, while the size of the cross-section of the lower part 420b is smaller than the size of the through hole 222 of the base 220 to ensure that the lower part 420b of the screw 420 may penetrate the through hole 222 and extend to below the base 220.

In addition, as FIG. 4A shows, since the fixer 460 is disposed on the frame 240, the base 220 is interposed between the frame 240 and the nut 440, and the fixer 460 may detour the base 220 to constrain the rotation of the nut 440. For an embodiment, the fixer 460 shows an L shape. A fixing side 460a of the L-shaped fixer 460 is fixed to the frame 240 above the base 220, the L-shaped fixer 460 detours the base 220, and a first end 460b of the L-shaped fixer 460 far away from the fixing side 460a is closely leaned on the nut 440 below the base 220. Also referring to FIG. 4B, the nut 440 adapted in this embodiment is a asymmetrical round nut with a plane side. The first end 460b of the L-shaped fixer 460 is closely attached to the plane side of the nut 440 to constrain the rotation of the nut 440. In addition, for a typical hexagon nut, the first end 460b may be closely attached to the plane side of the hexagon nut to constraint the rotation of the hexagon nut. However, the nut 440 used in the invention is not limited thereto. Any nut with a plane side is applicable in the invention.

Figure 5:
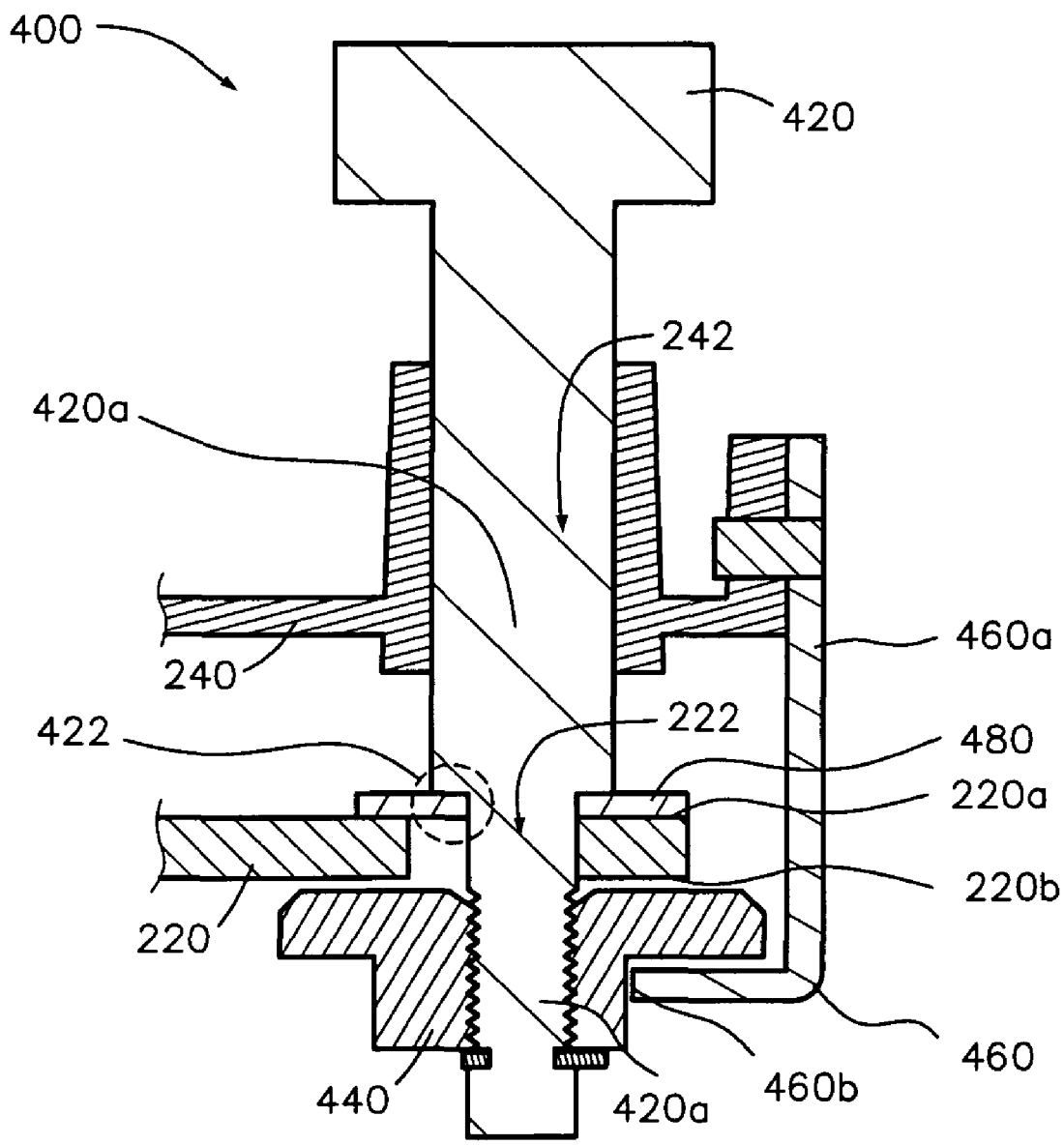
FIG. 5 is a cross-section view of another embodiment of the locking device in FIG. 3.

In the embodiment of FIG. 4A, the nut 440 and the ladder structure 422 clip the base 220 directly. However, the invention is not so limited. As FIG. 5 shows, in another embodiment of the invention, a washer 480 is disposed between the ladder structure 422 and the base 220. The size of the cross-section of the washer 480 is greater than the size of the through hole 222 of the base 220 to ensure the upper part 420a of the screw 420 is located above the base 220. Noticeably, the washer 480 in this embodiment is used as a medium between the ladder structure 422 and the upper surface 220a on the base 220. the size of the cross-section of the upper part 420a of the screw 420 only needs to be greater than the hole in middle of the washer 480 rather than the through hole 222 of the base 220.

Figure 6B:
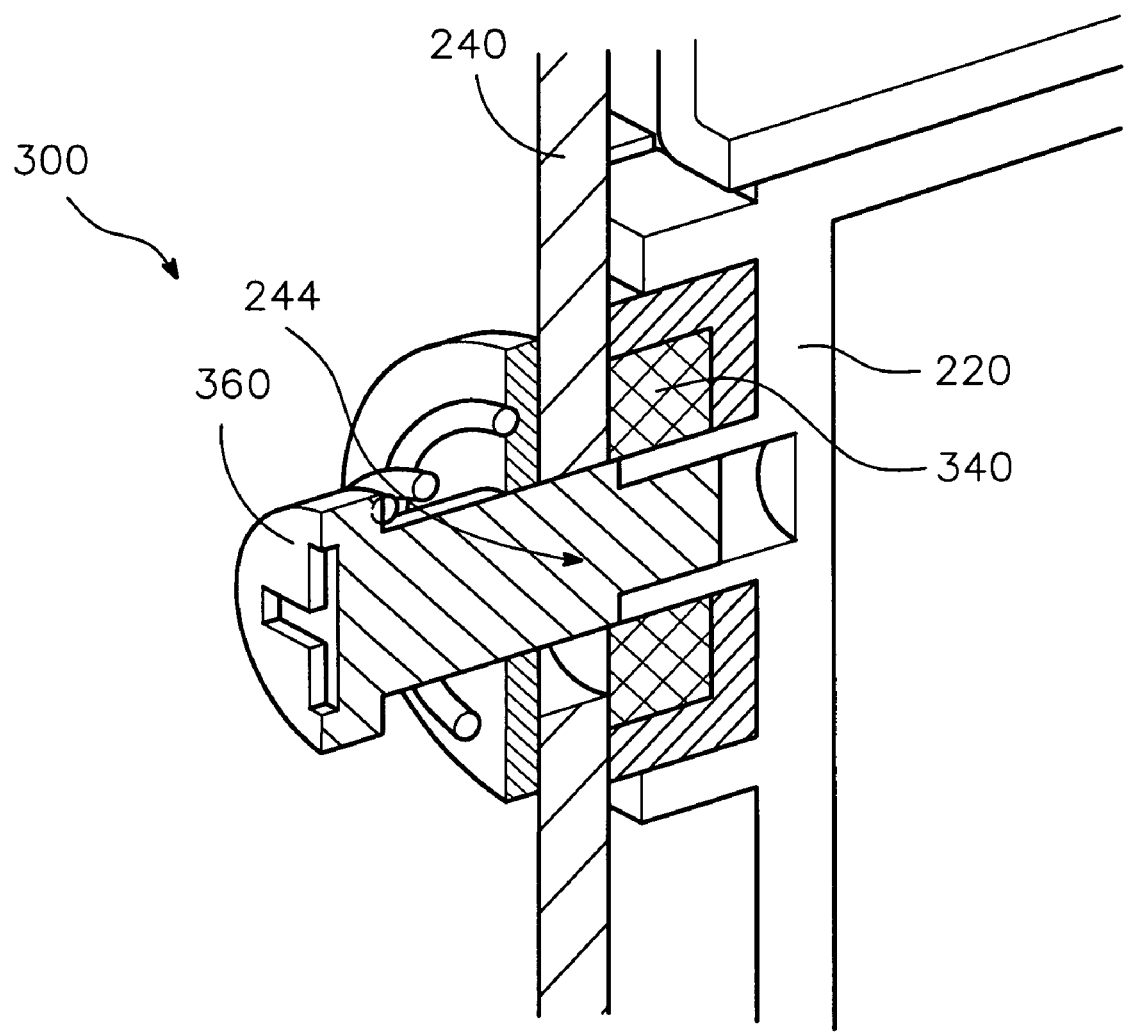
FIG. 6B is a cross-section view of the positioning structure in FIG. 3 along the vertical direction V.
Figure 6C:
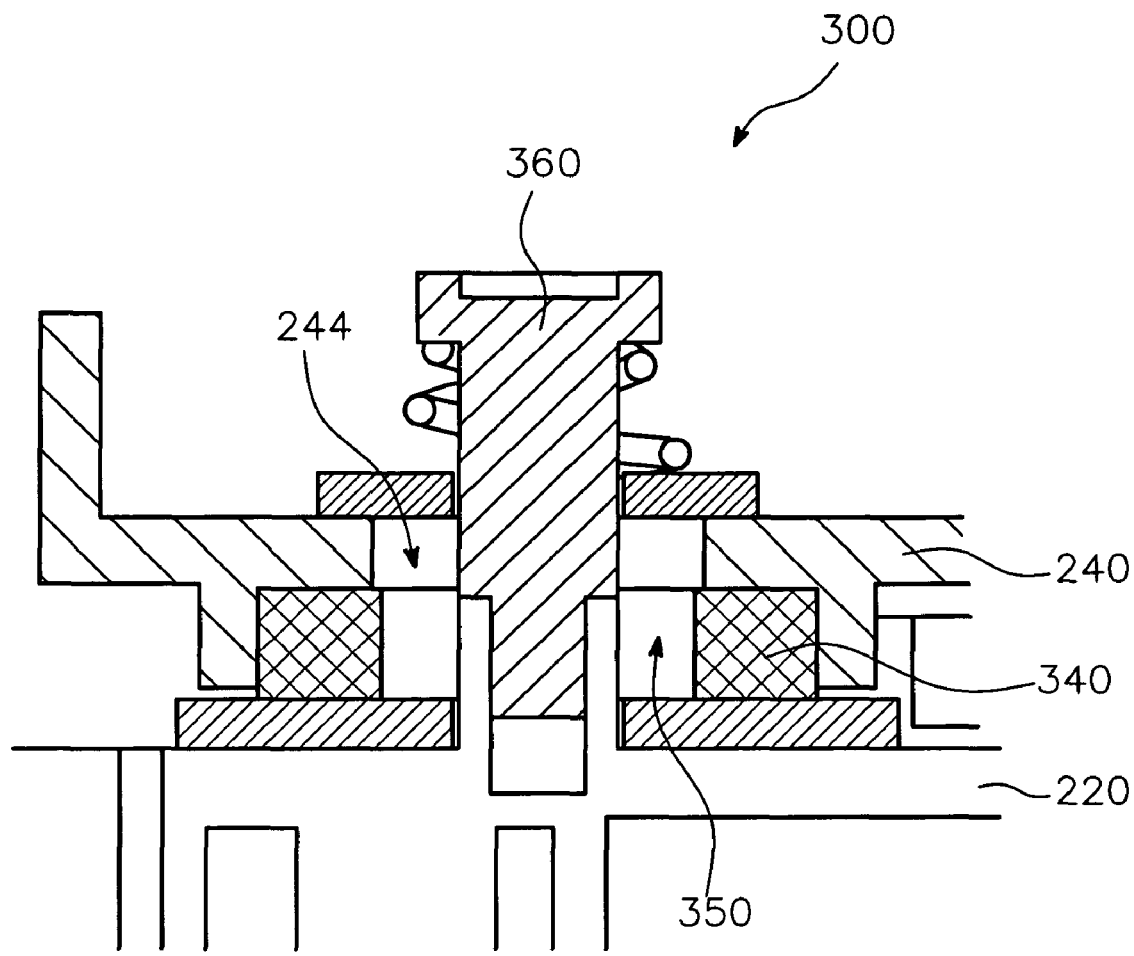
FIG. 6C is a cross-section view of the positioning structure in FIG. 3 along the horizontal direction H.

FIG. 6A is a schematic view of an embodiment of the positioning structure in FIG. 3. FIG. 6A shows the positioning structure 300 from the back side of the frame 240 with the base 220 in FIG. 3 being removed. FIGS. 6B and 6C are cross-section views of an embodiment of the positioning structure 300 in FIG. 3 along the vertical direction V and the horizontal direction H. As shown, the positioning structure 300 has a groove 320, a slider 340, and a positioning unit 360. The groove 320 is disposed on the frame 240. The slider 340 is disposed in the groove 320 and has a guiding hole 350 defined therein. The extending direction of the guiding hole 350 is substantially perpendicular to the extending direction of the groove 320. The positioning unit 360 penetrates the guiding hole 350 and is slidable along the extending direction of the guiding hole 350. The frame 240 has an opening 244 corresponding to the positioning unit 360. The size of the opening 244 is greater than the size of the cross-section of the end portion of the positioning unit 360 penetrating the opening 244. Hence, the positioning unit 360 may penetrate the slider 340 and the frame 240 to position the frame 240 and the slider 340 on the base 220.

Basically, the movable range of the frame 240 relative to the base 220 depends on the size and shape of the opening 244 of the frame 240. For an embodiment, the opening 244 of the frame 240 shows a trapezoid shape. The width of the opening 244 in the horizontal direction H gives the limitation of the movable range of the frame 240 in the horizontal direction H and the length of the opening 244 in the vertical direction V gives the limitation of the movable range of the frame 240 in the vertical direction V.

As to the locking device 400 mentioned above, since the horizontal movement of frame 240 with respect to the screw 420 is totally constrained and the horizontal movement of the screw 420 relative to the base 220 depends on the size and shape of the through hole 222 of the base 220, the movable range of the frame 240 relative to the base 220 is constrained by the size and shape of the through hole 222 of the base 220. Accordingly, as an embodiment, the size and shape of the opening 244 of the frame 240 corresponding to the positioning unit 360 are substantially the same as the size and shape of the through hole 222 of the base 220 corresponding to the screw 420. For example, if the opening 244 of the frame 240 shows a trapezoid shape, the through hole 222 of the base 220 is also trapezoid-shaped.

Figure 7:
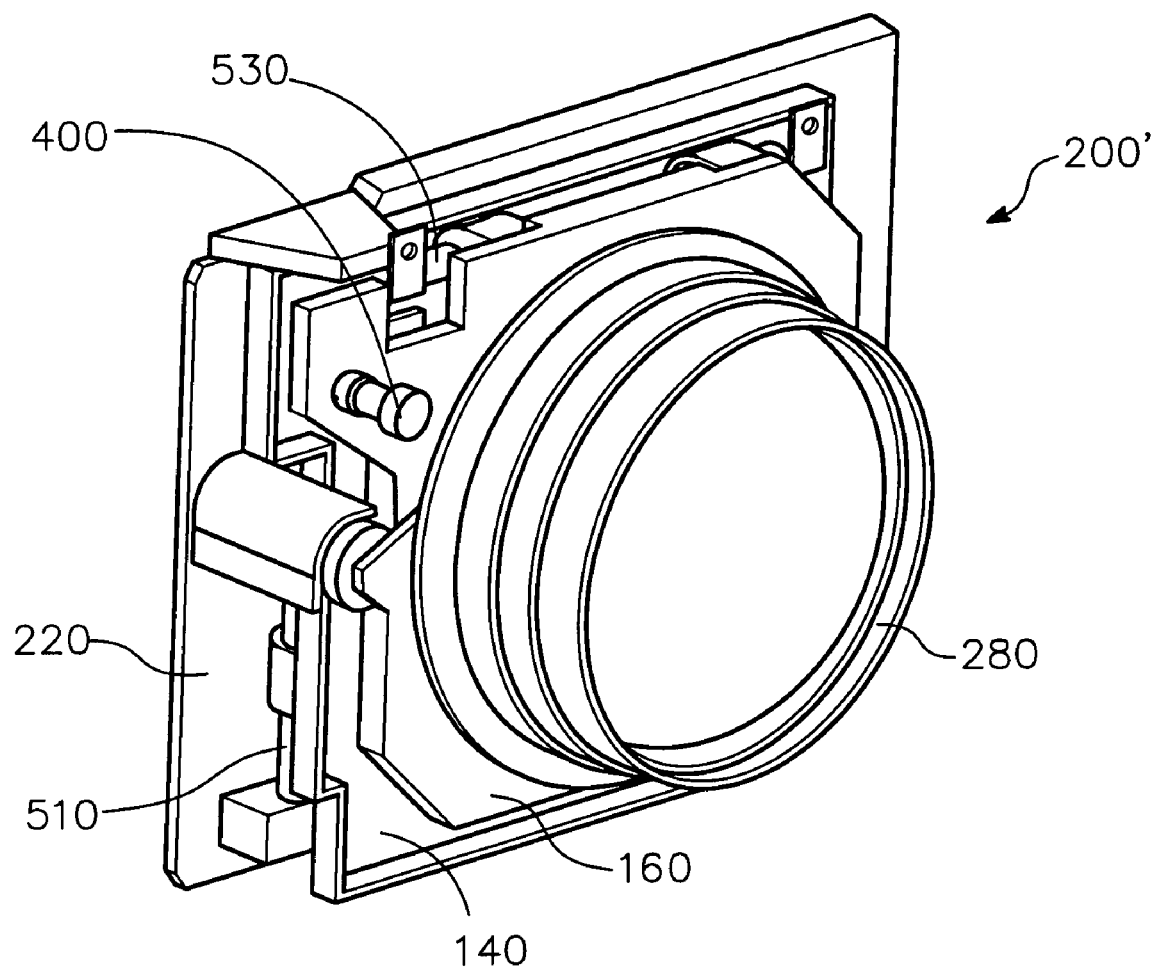
FIG. 7 is a schematic view of another embodiment of the lens adjusting device according to the invention.

FIG. 7 is a schematic view of another embodiment of the lens adjusting device 200' according to the invention. In contrast with the positioning structure 300 for movably positioning the frame 240 on the base 220 by using the positioning unit 360 (such as a screw), the positioning structure 300 in the embodiment is composed of at least one guiding rod, and there are two vertical guiding rods 510 and two horizontal guiding rods 530 shown in FIG. 7 for example. As shown, the two vertical guiding rods 510 are disposed by the left and the right sides of the base 220. A vertical adjusting frame 140 is slidably assembled to the two vertical guiding rods 510. The two horizontal guiding rods 530 are disposed by the upper and the lower sides of the vertical adjusting frame 140. A horizontal adjusting frame 160 is slidably assembled to the two horizontal guiding rods 530. The lens 280 is fixed on the horizontal adjusting frame 160. Thus, users may adjust the position of the lens 280 in vertical direction and horizontal direction by using the guiding rods 510,530. Noticeably, because the frames 140,160 are slidable with respect to the guiding rods 510,530, the frames 140,160 may not be used to fix the lens 280. To overcome the problem, the locking device 400 in the embodiment of the invention penetrates the horizontal adjusting frame 160 and the vertical adjusting frame 140 toward the base 220 to fix the two frames 140,160 on the base 220 so as to achieve the object of fixing the lens at the adjusted position.

Figure 1:
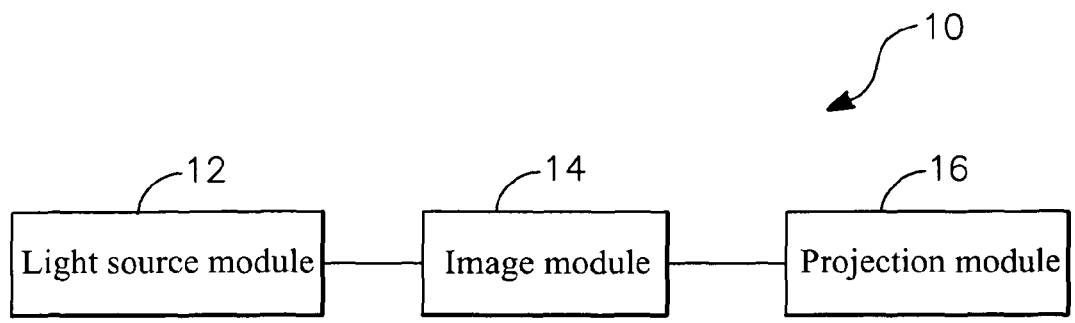
FIG. 1 is a block diagram of a conventional projector.
Figure 2:
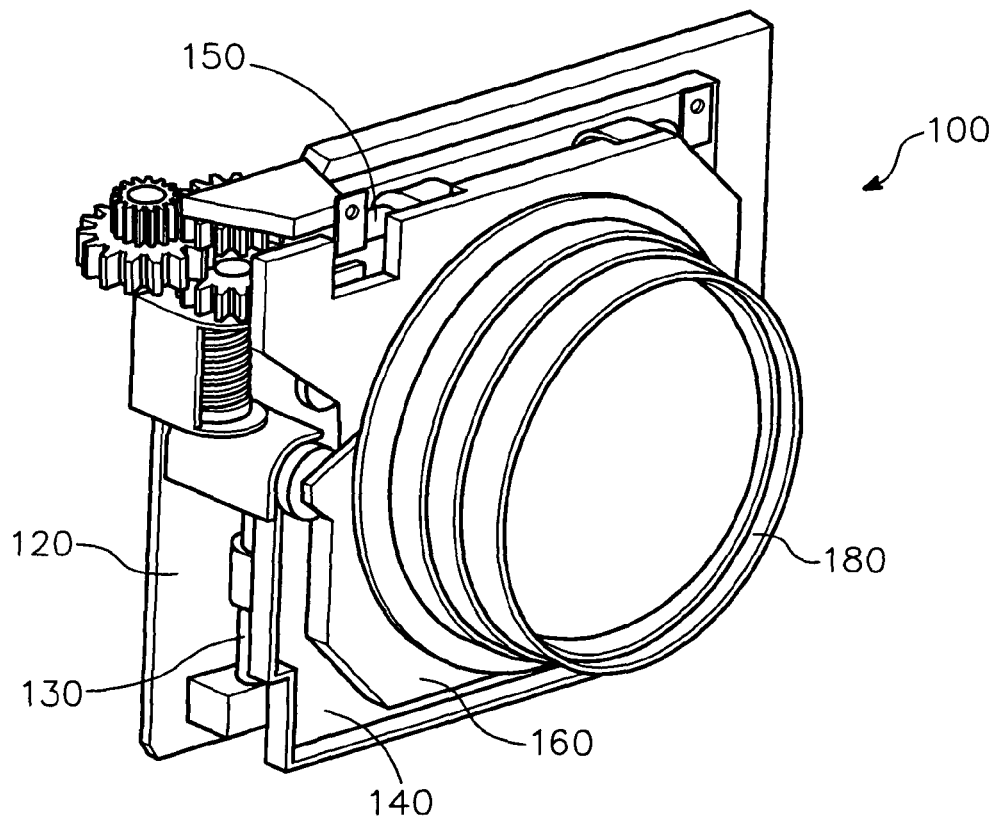
FIG. 2 is a schematic view of the lens adjusting device in a conventional projector.

The conventional lens adjusting device 100 needs motors for fixing the lens at the adjusted position. For example, when using the horizontal adjusting frame 160 and the vertical adjusting frame 140 as shown in FIG. 2, two motors are needed to fix the lens 180 in the horizontal direction and the vertical direction respectively. In comparison, the embodiments of the invention only needs one locking device 400 to fix the lens at the certain position and may reduce the burden of the motors. Moreover, as the position of the lens is adjusted manually, the lens adjusting device 200 in the embodiments of the invention may be used to fix the lens at the certain position without the need of the motor.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lens adjusting device, comprising:
   a frame having a guiding hole;
   a lens, fixed on the frame;
   a base, having a through hole;
   at least a positioning structure, disposed on the base for movably positioning the frame on a plane above the base; and
   a locking device, capable of locking the frame to the base, comprising:
      a screw, sequentially penetrating the guiding hole of the frame and the through hole of the base to extend to below the base, and the size of the through hole being greater than the size of a cross-section of the screw corresponding to the through hole;
      an asymmetrical round nut, disposed below the base to be assembled to the screw, such that the base is fastened between the screw and the asymmetrical round nut; and
      a fixer, disposed on the frame and capable of constraining rotation of the asymmetrical round nut;
   wherein when the screw is unfastened from the base, the lens is capable of moving in a horizontal direction and a vertical direction.

2. The lens adjusting device of claim 1, wherein the positioning structure comprises:
   a groove, disposed on the frame;
   a slider, disposed in the groove and having a guiding hole defined therein with an extending direction substantially perpendicular to an extending direction of the groove; and
   a positioning unit, slidably disposed in the guiding hole, penetrating the guiding hole, and positioning the frame and the slider on the base.

3. The lens adjusting device of claim 2, wherein the frame has at least one opening corresponding to the positioning unit, and the size of the opening is greater than a size of a cross-section of an end portion of the positioning unit penetrating the opening.

4. The lens adjusting device of claim 3, wherein the opening of the frame shows a trapezoid shape.

5. The lens adjusting device of claim 3, wherein the size and shape of the opening of the frame are substantially the same as the size and shape of the through hole of the base.

6. The lens adjusting device of claim 1, wherein the through hole of the base shows a trapezoid shape.

7. The lens adjusting device of claim 1, wherein the positioning structure comprises at least a guiding rod, and the frame is slidably disposed on the guiding rod.

8. The lens adjusting device of claim 1, wherein a main body of the screw has a ladder structure corresponding to an upper surface of the base, the ladder structure and the asymmetrical round nut lean on the upper surface and a lower surface of the base respectively for fixing the screw to the base.

9. The lens adjusting device of claim 8, wherein the locking device further comprises a washer disposed between the ladder structure and the base, and the size of a cross-section of the washer is greater than the size of the through hole of the base.

10. The lens adjusting device of claim 1, wherein the fixer shows a L shape, a fixing side of the fixer is fixed to the frame, and a first end of the fixer away from the fixing side is adjacent to the asymmetrical round nut.

11. The lens adjusting device of claim 10, wherein the asymmetrical round nut has a plane side corresponding to the first end of the fixer, and the first end is closely attached to the plane side of the asymmetrical round nut for constraining the rotation of the asymmetrical round nut.

12. The lens adjusting device of claim 1, wherein the frame has a guiding hole, the screw penetrating the guiding hole of the frame is fixed on the base, and the screw is slidably disposed in the guiding hole.

* * * * *